Figure 1:
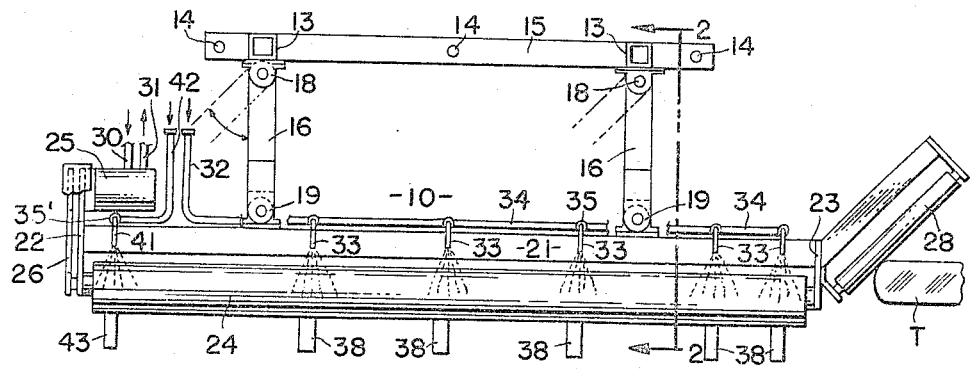
Figure 1:
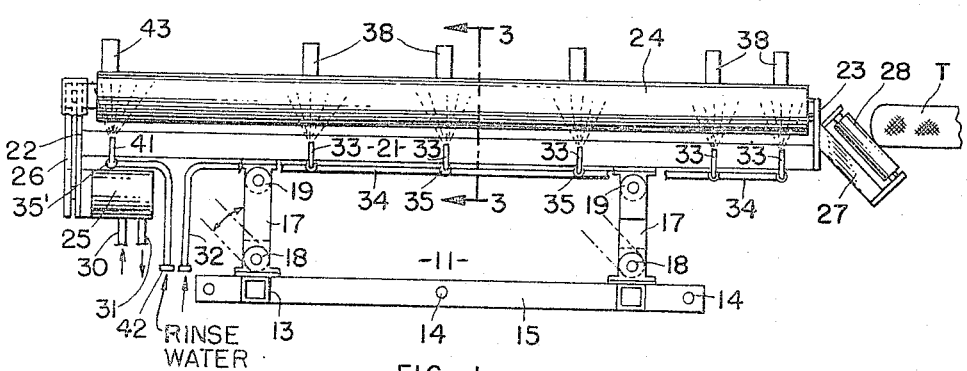

Oct. 17, 1967  R. G. CONSOLO  3,346,895
WHEEL AND TIRE WASHING APPARATUS
Filed May 5, 1966

INVENTOR.
RALPH G. CONSOLO
BY
ATTORNEY

United States Patent Office 3,346,895
Patented Oct. 17, 1967

3,346,895
WHEEL AND TIRE WASHING APPARATUS
Ralph G. Consolo, 2072 S. Green Road,
South Euclid, Ohio 44121
Filed May 5, 1966, Ser. No. 547,880
6 Claims. (Cl. 15—21)

This invention relates to an improved apparatus for washing and scrubbing the tires and wheels of a vehicle as the vehicle travels along a path substantially parallel to and between a pair of opposed washing and brushing units operable by engagement with the tires and wheels to relatively spread the normally extended units and automatically spray the tires and wheels with water and cleaning fluid and to brush and scrub them as they move along the path between the units, and then subsequently, as the tires are disengaged from the units as they pass therebeyond, to shut off the supply of fluid and cleaner, deactivate the brushing or scrubbing means and allow the spread-apart units to return to their normally extended position preparatory to a subsequent cycle of operation.

It is an object of the present invention to construct an apparatus of this character which eliminates the use of springs, geared or fluid pressure driven actuating means to return the units to normal extended position after the passage of a vehicle along and beyond the path of travel during a cleaning operation.

Another object is to provide an apparatus of this character which is extremely simple in construction and economical in operation and which is therefore relatively inexpensive to manufacture.

Another object of the invention is to eliminate the use of fluid pressure, electric or mechanical controls in returning the units to their full normal extended positions after the passage of a vehicle therebetween, thereby materially enhancing the ease of operation of the apparatus while eliminating costly installations for this purpose.

A further object of the invention is to reduce to bare essentials the means by which the cleaning and scrubbing units are retracted by contact with the tires of the front wheels of the moving vehicle and maintained in such position during the washing and scrubbing of the tires as the vehicle travels along the apparatus and until the rear wheels pass out of contact with the apparatus, at which time the spread-apart units are returned to normal extended position under the influence of gravity alone.

Another object is the provision of a pair of laterally spaced apart gravity actuated washing and brushing or scrubbing units of the type disclosed herein, in which one of the pair is pivotally mounted to move about a radius greater than that of the other unit of the pair whereby to allow the units to effectively engage the tires on the opposite sides of a vehicle simultaneously regardless of the different tread dimensions of vehicles passing through the apparatus and to thus provide for self-adjustment of the units to selected tread dimensions.

A still further object is to provide tire actuated valve tripping means to progressively and automatically actuate jet nozzles spaced at intervals on opposite sides and along the path of travel of the vehicle as it passes therebetween, thus materially reducing wasteful water and cleanser consumption which otherwise would occur should all of the jets be allowed to function simultaneously.

Other and further objects and advantages of this invention will become more apparent from the following description and claims, reference being made to the accompanying drawing which shows an embodiment of the present invention and the principles thereof, and in which drawing like reference characters are employed to designate like parts throughout the same.

Figure 2:
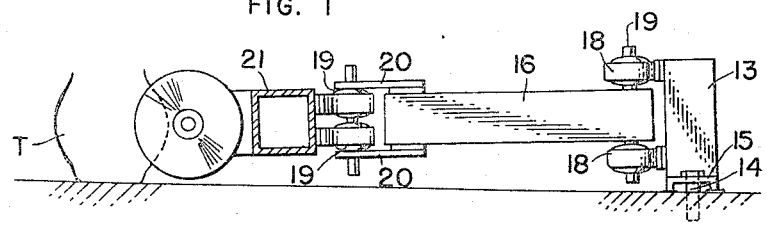
Figure 3:
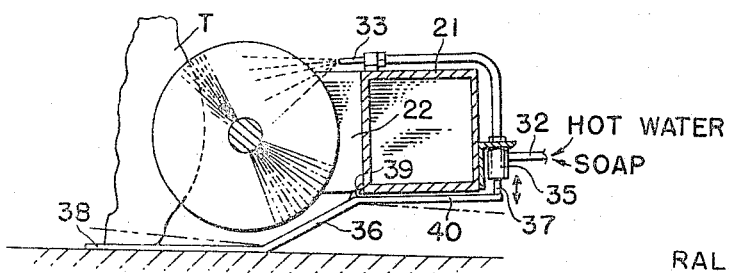

In the drawings:
FIGURE 1 is a plan view of an apparatus illustrating an embodiment of my invention showing the laterally spaced-apart washing and brushing or scrubbing units in their normal extended position for engagement by the wheels or tires of a vehicle advancing from right to left therebetween;
FIGURE 2 is a section taken on line 2—2 of FIGURE 1; and
FIGURE 3 is an enlarged section taken on line 3—3 of FIGURE 1.

In carrying out the invention, as illustrated in the drawings, I provide a pair of laterally spaced-apart washing and scrubbing and/or brushing units, indicated at 10 and 11, respectively, between which a vehicle is directed to pass either by means of a conveyor (not shown), or driven under its own power, along the path and in the direction of travel, indicated by the arrow 12.

Each unit is pivotally carried on a fixed support 13 which may be bolted or otherwise anchored securely at 14 to a base 15. These units each include a pair of arms 16 and 17, respectively, pivotally supported at one end in sealed bearings 18 carried by the support 13.

Either the support 13 or the axis of rotation indicated at 19 may be tilted out of the vertical in the direction of the forward end of the arms so as to dispose the arms and the mechanism carried thereby in a forwardly and downwardly inclined direction which is more clearly illustrated in FIGURE 2. The purpose of this arrangement will be referred to hereinafter more fully.

It is also to be noted that the arms 16 of one of the pairs of units are of substantially equal length and are longer than the arms 17 of the opposite unit so that these respective units, when moved toward the broken line positions of FIGURE 1, will assume angular positions with respect to the support 13 about different radii. As shown in FIGURE 1, the arms 16 being of greater length than the arms 17, enable the unit 10 to extend forwardly in a normal position closer to the center line of travel indicated by the arrow 12 than is the case with unit 11, when extended. In this way, the passage of cars having different tread widths, such as compacts, standard or wide track cars, is readily accommodated without interfering with the operation of the apparatus.

The forward ends of the pivoted arms 16 and 17 are pivotally connected to sealed bearings 19 by means of the brackets 20, the bearings 19 being rigidly supported on a rail 21 which may be of tubular form, as shown, or which may be of solid construction.

End plates 22 and 23 are rigidly secured to the respective ends of the rail and extend forwardly thereof. These end plates 22 and 23 support the rotatable brush 24, the end plate 22 also serving as a support for a hydraulic motor 25 and a drive chain or belt and drive wheels indicated generally at 26 for rotating the brush, while the end plate 23 supports a bracket 27 on which is rotatably mounted a roller 28 positioned for initial engagement by the tire T of the vehicle as the vehicle enters the cleaning area.

The hydraulic motor 25 is connected to a source of fluid pressure which enters the motor in the direction of the arrow 30 and which is exhausted through the pipe 31.

A source of hot water and cleanser (not shown) is connected to the conduits 32 of each of the units and is communicated to the series of jet nozzles 33 which are arranged along the length of the conduit 34 at spaced apart intervals of each of the units, the nozzles being directed forwardly toward the rotating brush or scrubber and the tire T.

A trip operated valve 35 is located in the line between each of the jet nozzles and the supply conduit 34 and is normally closed to block the passage of fluid into the jet nozzles when the pivoted trip 36 is in the broken line position, as shown in FIGURE 3. When closed, the valve plunger 37 is in down position either by force of the fluid pressure in line 30 or when fluid pressure is off, but is opened when a vehicle tire T passes over the outer tread portion 38 of the trip in its journey along the apparatus causing the trip to assume the full line position about its fulcrum 39, as in FIGURE 3, to raise its inner portion 40 to engage and lift the valve plunger 37. It is to be noted that a valve 35 is associated with each jet nozzle and is actuated to open position only when the tread 38 of the trip is depressed.

At the exit end of the apparatus, I provide a spray jet nozzle 41 directed toward the tire and connected to a line 42 supplying rinse water to the jet head from a convenient source of fluid pressure (not shown) through a valve 35' which is actuated by the trip device 43, or similar manner as the spray jet nozzles 33 and the valves 35.

As the rear vehicle tires pass to the left in FIGURE 1 beyond and clear of the trip 43, each unit will return to its normal extended position as shown in FIGURE 1 solely by gravitational pull, since when the units are retracted by the wheels of a vehicle moving from right to left in engagement first with the rollers 28 and then with the rotating brushes 24, the arms 16 and 17 of the units assume the dotted line positions, thus progressively elevating the units at the forward portions. Under these conditions, when the rear wheels and the vehicle are out of supporting contact with the units, these units will, by the force of gravity alone, return to the positions shown in FIGURE 1.

Rotation of the brushes 24 may be controlled manually or automatically by a suitable valve in the fluid pressure line 30–31. The fluid motor may be replaced by an electric motor with suitable controls, if desired, for driving the brushes.

The foregoing description and accompanying drawing are considered as illustrative only of the principles of the invention and the wheel and tire washing apparatus of the present invention is not to be regarded as limited by the above described embodiment. Alternative arrangements of parts, substitution of materials and other organization and assembly procedures, apparent to those skilled in the art, may be employed without departing from the scope and spirit of the invention as claimed.

I claim:

1. A washing apparatus for washing the wheels and tires of an automobile as the vehicle proceeds along a predetermined path of travel comprising a pair of elongate washing and brushing units spaced apart laterally and pivotally supported on opposite sides of and in the path of travel of the vehicle and engageable thereby for movement about their pivots in opposed lateral and upward directions, said units each including vehicle wheel engaging means at the approach end thereof, an elongate rotary tire engaging brush, means for driving the rotatable brush in response to said upward and lateral movement of the units, and liquid spray means carried by said units to direct liquid in spray form toward said brush and tires as said wheels and tires enter and pass through the spray zone.

2. The apparatus defined in claim 1 in which said units are returned by gravity alone to their initial position of rest when the vehicle wheels and tires pass out of contact with said units.

3. A washing apparatus for washing the wheels and tires of an automobile as the vehicle proceeds along a predetermined path of travel comprising a pair of elongate washing and brushing units spaced apart laterally and pivotally supported on opposite sides of and in the path of travel of the vehicle and engageable thereby for movement about their pivots in opposed lateral and upward directions, said units each including vehicle wheel engaging means at the approach end thereof, an elongate rotary tire engaging brush, means for driving the rotatable brush in response to said upward and lateral movement of the units, liquid spray means carried by said units to direct liquid in spray form toward said brush and tires as said wheels and tires enter and pass through the spray zone, said spray means comprising a plurality of spaced apart jet nozzles fixed on said units and movable therewith and directed toward the path traversed by the vehicle wheels and tires, a conduit carried by each of said units for supplying liquid from a source to said jet nozzles, and tread means associated with said nozzles and arranged in the path of movement of said wheels and tires whereby said jet nozzles are actuated in response to engagement of the tires with said treads to direct a liquid spray thereagainst.

4. The invention set forth in claim 3 wherein said jet nozzles are actuated in progressive succession in timed relation to the progress of the vehicle along its path of travel between said raised pivoted units.

5. The invention set forth in claim 1 wherein the pivotal axes of said unit pivotal supports are inclined out of the vertical toward said path of travel.

6. The invention set forth in claim 3 wherein said units each comprise a pair of spaced apart fixed supporting members, a pair of arms each pivotally attached at one end to the respective supporting members, a rail rotatably supporting said brush, said rail having a pivotal connection with each of the respective arms at their ends opposed to said first mentioned ends, and brush drive means carried on said rails.

References Cited

UNITED STATES PATENTS 2,822,564   2/1958   Crivelli.
2,910,202   10/1959  Clarke et al.

CHARLES A. WILLMUTH, *Primary Examiner.*

E. L. ROBERTS, *Assistant Examiner.*